(12) United States Patent
Van De Sluis et al.

(10) Patent No.: US 12,040,913 B2
(45) Date of Patent: Jul. 16, 2024

(54) SELECTING A DESTINATION FOR A SENSOR SIGNAL IN DEPENDENCE ON AN ACTIVE LIGHT SETTING

(71) Applicant: SIGNIFY HOLDING B.V., Eindhoven (NL)

(72) Inventors: Bartel Marinus Van De Sluis, Eindhoven (NL); Anthonie Hendrik Bergman, Nuenen (NL); Tim Dekker, Eindhoven (NL); Dirk Valentinus René Engelen, Heusden-Zolder (BE); Jochen Renaat Van Gheluwe, Lommel (BE); Berent Willem Meerbeek, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 463 days.

(21) Appl. No.: 17/292,022

(22) PCT Filed: Nov. 18, 2019

(86) PCT No.: PCT/EP2019/081583
§ 371 (c)(1),
(2) Date: May 7, 2021

(87) PCT Pub. No.: WO2020/104349
PCT Pub. Date: May 28, 2020

(65) Prior Publication Data
US 2021/0399915 A1    Dec. 23, 2021

(30) Foreign Application Priority Data
Nov. 20, 2018   (EP) .................................... 18207130

(51) Int. Cl.
*H04L 12/28* (2006.01)
*H05B 47/11* (2020.01)
*H05B 47/175* (2020.01)

(52) U.S. Cl.
CPC .......... *H04L 12/2827* (2013.01); *H05B 47/11* (2020.01); *H05B 47/175* (2020.01); *H04L 2012/285* (2013.01)

(58) Field of Classification Search
CPC .... H05B 47/175; H05B 47/105; H05B 47/11; H04L 12/2827
See application file for complete search history.

(56) References Cited

U.S. PATENT DOCUMENTS 6,980,079 B1 * 12/2005 Shintani .............. H04L 12/2827
340/3.1
10,988,073 B1 * 4/2021 Boyd ................. G06Q 30/0645
(Continued)

FOREIGN PATENT DOCUMENTS

CA        3122468 A1 *  4/2015  .............. F24F 11/30
WO   WO-2005057988 A1 *  6/2005  ......... H05B 37/0218
(Continued)

*Primary Examiner* — Yong Hang Jiang (57) ABSTRACT

The invention relates to an electronic device (1) for obtaining a sensor signal for use in a system (11) which changes a sensing function in dependence on a light setting. The electronic device is configured to obtain a sensor signal from a sensor (9) and select based on data stored in a memory (7) which device and/or application of a plurality of devices (21, 31, 45, 46) and/or applications the sensor signal should be transmitted to. The selection depends on which light setting is currently active on one or more light devices (13-15). The sensor is arranged to sense in a field of view. The electronic device is further configured to transmit the sensor signal to the selected device and/or application.

7 Claims, 8 Drawing Sheets

(56) References Cited

U.S. PATENT DOCUMENTS

| | | | | |
|---|---|---|---|---|
| 2010/0148672 A1* | 6/2010 | Hopper | ............... | F21V 23/0442 |
| | | | | 315/158 |
| 2015/0035437 A1* | 2/2015 | Panopoulos | ......... | H05B 47/105 |
| | | | | 315/291 |
| 2016/0066393 A1* | 3/2016 | Bosua | .................... | H05B 45/20 |
| | | | | 315/307 |
| 2016/0198548 A1* | 7/2016 | Monaci | .................. | H05B 47/11 |
| | | | | 315/297 |
| 2016/0330825 A1* | 11/2016 | Recker | ................. | H05B 47/115 |
| 2017/0223807 A1* | 8/2017 | Recker | ...................... | H02J 7/34 |
| 2017/0245347 A1 | 8/2017 | Zhou et al. | | |

FOREIGN PATENT DOCUMENTS

| | | | |
|---|---|---|---|
| WO | 2017009234 | A1 | 1/2017 |
| WO | 2017194358 | A1 | 11/2017 |
| WO | 2018054752 | A1 | 3/2018 |
| WO | 2018065229 | A1 | 4/2018 |
| WO | 2018127427 | A1 | 7/2018 |

* cited by examiner

SELECTING A DESTINATION FOR A SENSOR SIGNAL IN DEPENDENCE ON AN ACTIVE LIGHT SETTING

CROSS-REFERENCE TO PRIOR APPLICATIONS

This application is the U.S. National Phase application under 35 U.S.C. § 371 of International Application No. PCT/EP2019/081583, filed on Nov. 18, 2019, which claims the benefit of European Patent Application No. 18207130.8, filed on Nov. 20, 2018. These applications are hereby incorporated by reference herein.

FIELD OF THE INVENTION

The invention relates to an electronic device for obtaining a sensor signal for use in a system which changes a sensing function in dependence on a light setting and to an electronic device for configuring a device which is arranged to obtain a sensor signal, said device being configured in dependence on a light setting.

The invention further relates to a method of obtaining a sensor signal for use in a system which changes a sensing function in dependence on a light setting and to a method of configuring a device which is arranged to obtain a sensor signal, said device being configured in dependence on a light setting.

The invention also relates to a computer program product enabling a computer system to perform one or more of such methods.

BACKGROUND OF THE INVENTION

Sensors are frequently used together with light devices. Most common is the activation of a light source based on a sensor signal of a light sensor and/or a motion sensor. However, it is also known to change sensor operation in dependence on an active light setting.

WO 2018/065229 discloses a method of configuring a lighting system including one or more sensors for controlling one or more lighting units. The method allows a target area to be determined for a particular sensing function and then determines suitable sensor locations based on a mapping derived from an image of the target area. In an embodiment, the selected light scene is taken into account when configuring the sensors. For instance, in a scene "watching TV on the couch", the sensor covering the couch is used at highest sensitivity to recognize fine motion while the sensors in the other part of the room are used at low sensitivity or are temporarily disabled.

However, sensors are not only used for lighting functions. Connected lighting is an important function of smart home systems and those systems often also have a variety of devices with sensing capabilities. These may be sensor devices to trigger the lighting devices, or they may be sensing for other purposes, e.g. for monitoring babies, older children or elderly people, or for detecting environmental safety or security. Each application typically uses its own sensor device(s). This results in many sensor devices being installed in homes and offices, which increases power consumption and decreases the buildings' aesthetics.

WO 2017/009234 A1 a system for configuring a first device in a lighting system is disclosed. The configuration system comprises a memory arranged for storing one or more light settings, a communication unit, a processor for identifying a device property of the first device based on information received from the first device via the communication unit. The processor is further arranged for accessing one or more light settings stored in the memory, and for associating the device property with at least one light setting rule of at least one of the one or more light settings only if the device property is compliant with the respective light setting rule, and for storing the association. This allows a user to connect the first device to the configuration system, whereupon the configuration system determines the functionality of the first device in the lighting system based on the light settings stored in the memory.

SUMMARY OF THE INVENTION

It is a first object of the invention to provide an electronic device for obtaining a sensor signal, which helps reduce the number of sensor devices that is needed for a certain set of applications.

It is a second object of the invention to provide an electronic device for configuring a device, which helps reduce the number of sensor devices that is needed for a certain set of applications.

It is a third object of the invention to provide a method of obtaining a sensor signal, which helps reduce the number of sensor devices that is needed for a certain set of applications.

It is a fourth object of the invention to provide a method of configuring a device, which helps reduce the number of sensor devices that is needed for a certain set of applications.

In a first aspect of the invention, an electronic device for obtaining a sensor signal for use in a system which changes a sensing function in dependence on a light setting comprises at least one input interface, at least one output interface, and at least one processor arranged to use said at least one input interface to obtain a sensor signal from a sensor, said sensor being arranged to sense in a field of view, select based on data stored in a memory which device and/or application of a plurality of devices and/or applications said sensor signal should be transmitted to, said selection depending on which light setting is currently active on one or more light devices, and use said at least one output interface to transmit said sensor signal to said selected device and/or application.

By selecting to which device and/or application a sensor signal should be transmitted based on which light setting is currently active, e.g. by transmitting a sensor signal to a different device or application when a different light scene is automatically or manually selected, a single sensor device can be used for multiple devices and/or applications without requiring a user to explicitly select a different sensor mode on the sensor device. This is beneficial, as it typically depends on the situation which device or application a user wants to use, and thus which device and/or application needs to receive sensor input, and the active light setting gives a strong indication of the situation.

Said electronic device may comprise said sensor. Alternatively, said at least one processor may be arranged to obtain said sensor signal by receiving said sensor signal from a sensor device. Said electronic device may be part of a lighting system which further comprises said light device and/or said sensor device.

Said at least one processor may be arranged to use said at least one input interface to obtain information indicating which light setting is currently active on said one or more light devices and select said device and/or application by determining from said data which device and/or application of said plurality of devices and/or applications is associated with said indicated light setting. This has as benefit that the electronic device does not need to rely on another device to configure it. If the electronic device is a bridge to which a sensor device comprising the sensor is connected, the information may be a light command destined for a light device that is also connected to the bridge, for example. If the electronic device is a sensor device, the information may be obtained by monitoring wireless transmissions of light commands transmitted to light devices, for example.

Alternatively or additionally, said at least one processor may be arranged to determine from said sensor signal which light setting is currently active on said one or more light devices and select said device and/or application by determining from said data which device and/or application of said plurality of devices and/or applications is associated with said determined light setting. This has as benefit that the electronic device does not need to rely on another device to configure it. The active light setting may be determined from the sensor input by detecting properties of the light output (e.g. brightness, colors or dynamic pattern) or by detecting a code in the light output which is associated with the light setting, for example.

A first device and/or application of said plurality of devices and/or applications may be a lighting control device and/or application and a second device and/or application of said plurality of devices and/or applications may be a device and/or application different from a lighting control device and/or application. Said first device and/or application may be a node in a lighting network and said second device and/or application may be arranged to render on-screen information in dependence on said sensor signal, for example. For instance, said first device and/or application may be configured to control a light, e.g. turn on and/or off the light, in dependence on the sensor signal. Said second device and/or application may be arranged to perform at least one of: sleep monitoring, baby monitoring, security monitoring, behavior monitoring, people counting, pet monitoring, video conferencing, and health monitoring, for example.

Said second device and/or application may be arranged to cause a speaker and/or a display to render verbal information, for example. Rendering of verbal information, i.e. consisting of words, is beneficial for many applications other than light control applications and some of these other applications may also be able to advantageously benefit from sensor input. The verbal information may comprise an alert that motion or a person has been detected (e.g. for security monitoring) or that sound has been detected (e.g. for security or baby monitoring) or information on sleep states, for example. Verbal information may be rendered via the speaker by using speech synthesis or by using a set of recorded voice messages, for example. The speaker and/or the display may be part of the second device or part of a different device.

Said at least one processor may be arranged to select a sensor setting from a plurality of sensor settings based on said data, said sensor setting being associated with said light setting, and configure said sensor according to said selected sensor setting, wherein said plurality of sensor settings differ from each other in that they result in sensor signals comprising different amounts of data, said amount of data in a sensor signal depending on a desired level of privacy, a desired level or accuracy and/or a desired type of information.

This is beneficial, for example, if the electronic device comprises the sensor. Different applications typically require different types of information and/or different levels of accuracy. For example, a sensor signal comprising one video frame per second may be sufficient for a security application, but a video chat application may need more frames per second, e.g. 25. It may be desirable to ensure that a sensor signal transmitted outside a home area network or a sensor signal transmitted outside a home area network over a less secure link does not comprise sensitive information, e.g. physiological measurements like heart rate measurements.

Said at least one processor may be arranged to select a signal adaptation method from a plurality of signal adaptation methods based on said data, said selected signal adaptation method being associated with said currently active light setting, and adapt said sensor signal by applying said selected signal adaptation method before transmitting said sensor signal to said selected device and/or application, wherein said plurality of signal adaptation differ from each other in that they result in sensor signals comprising different amounts of data, said amount of data in a sensor signal depending on a desired level of privacy, a desired level or accuracy and/or a desired type of information. This is beneficial, for example, if the electronic device does not comprise the sensor and is not able to change a setting of the sensor.

In a second aspect of the invention, an electronic device for configuring a device which is arranged to obtain a sensor signal comprises at least one input interface, at least one output interface, and at least one processor arranged to use said at least one input interface to obtain an input signal comprising a request to have one or more light devices render a new light setting, determine from data stored in a memory which device and/or application of a plurality of devices and/or applications is associated with said new light setting, and use said at least one output interface to configure a further device to transmit a sensor signal to said determined device and/or application, said sensor signal being obtained from a sensor arranged to sense in a field of view.

In a third aspect of the invention, a method of obtaining a sensor signal for use in a system which changes a sensing function in dependence on a light setting comprises obtaining a sensor signal from a sensor, said sensor being arranged to sense in a field of view, selecting based on data stored in a memory which device and/or application of a plurality of devices and/or applications said sensor signal should be transmitted to, said selection depending on which light setting is currently active on one or more light devices, and transmitting said sensor signal to said selected device and/or application. Said method may be performed by software running on a programmable device. This software may be provided as a computer program product.

In a fourth aspect of the invention, a method of configuring a device which is arranged to obtain a sensor signal comprises obtaining an input signal comprising a request to have one or more light devices render a new light setting, determining from data stored in a memory which device and/or application of said plurality of devices and/or applications is associated with said new light setting, and configuring a further device to transmit a sensor signal to said determined device and/or application, said sensor signal being obtained from a sensor arranged to sense in a field of view. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least a first software code portion, the software code portion, when executed or processed by a computer, being configured to perform executable operations for obtaining a sensor signal for use in a system which changes a sensing function in dependence on a light setting.

These executable operations comprise obtaining a sensor signal from a sensor, said sensor being arranged to sense in a field of view, selecting based on data stored in a memory which device and/or application of a plurality of devices and/or applications said sensor signal should be transmitted to, said selection depending on which light setting is currently active on one or more light devices, and transmitting said sensor signal to said selected device and/or application.

A non-transitory computer-readable storage medium stores at least a second software code portion, the software code portion, when executed or processed by a computer, being configured to perform executable operations for configuring a device which is arranged to obtain a sensor signal, said device being configured in dependence on a light setting.

These executable operations comprise obtaining an input signal comprising a request to have one or more light devices render a new light setting, determining from data stored in a memory which device and/or application of said plurality of devices and/or applications is associated with said new light setting, and configuring a further device to transmit a sensor signal to said determined device and/or application, said sensor signal being obtained from a sensor arranged to sense in a field of view.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
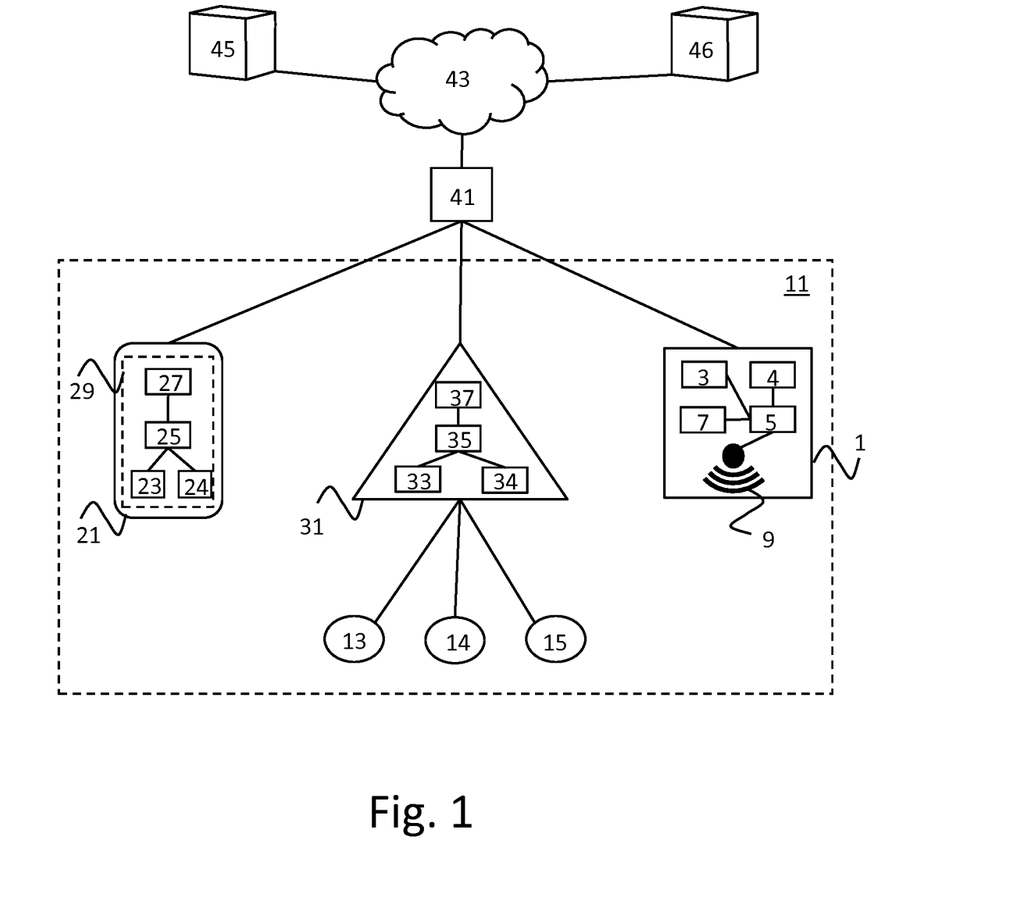
FIG. 1 is a block diagram of a first embodiment of a device for obtaining a sensor signal and first and second embodiments of a device for configuring the device for obtaining the sensor signal.

FIG. 1 shows a first embodiment of an electronic device for obtaining a sensor signal: sensor device 1. FIG. 1 also shows a first embodiment and a second embodiment of an electronic device for configuring a device for obtaining a sensor signal: mobile device 21 and bridge 31. The sensor device 1 may be a Philips Hue Tap switch and the bridge 31 may be a Philips Hue bridge, for example. Sensor device 1, bridge 31 and mobile device 21 are connected to a wireless LAN access point 41.

The wireless LAN access point 41 is connected to the Internet (backbone) 43. Internet servers 45 and 46 are also connected to the Internet (backbone) 43. Light devices 13, 14 and 15 communicate wirelessly with the bridge 31, e.g. using the Zigbee protocol, and can be controlled via the bridge 31, e.g. by the mobile device 21. The light devices 13-15 may be Philips Hue lights, for example. In an alternative embodiment, light devices are controlled without a bridge. The mobile device 21 may be a mobile phone or a tablet, for example. A lighting system 11 comprises the mobile device 21, the bridge 31, the sensor device 1 and the light devices 13-15.

The sensor device 1 comprises a receiver 3, a transmitter 4, a processor 5, a memory 7, and a sensor 9. The processor 5 is arranged to use an internal bus to obtain a sensor signal from the sensor 9. The sensor 9 is arranged to sense in a field of view. The sensor 9 may be a presence sensor, for example. The processor 5 is further arranged to select based on data stored in the memory 7 which device and/or application of a plurality of devices and/or applications the sensor signal should be transmitted to.

The selection depends on which light setting is currently active on the light devices 13-15. In the embodiment of FIG. 1, the mobile device 21 and/or the bridge 31 transmit a configuration message (also referred to as sensor control command if a sensor is configured) to the sensor device 1 informing the sensor device 1 to which device and/or application of the plurality of devices and/or applications the sensor signal should now be transmitted. The sensor device 1 then stores this information in its memory 7 as the above-mentioned data. In the embodiment of FIG. 1, the sensor device 1 does not know itself which light setting is active on the light devices 13-15. It is sufficient that the selected device and/or application are identified in the memory 7. The processor 5 is further arranged to use the transmitter 4 to transmit the sensor signal to the selected device and/or application.

For example, at a first moment, when a first light scene is active, the sensor device 1 transmits the sensor signal to a lighting control device or application and at a second moment, when a second light scene is active, the sensor device 1 transmits the sensor signal to a device and/or application different from a lighting control device or application.

The sensor signal may be transmitted to different applications running on the same device or may be transmitted to different devices. As an example of the latter, the sensor signal may be transmitted to bridge 31 or to a sleep monitoring application running on an Internet server 45 depending on the active light scene. As an example of the former, the sensor signal may be transmitted to a lighting control application or a baby monitoring application running on the Internet server 46 depending on the active light scene.

Applications different from a lighting control application are, for example, sleep monitoring, baby monitoring, security monitoring, behavior monitoring, people counting, pet monitoring, video conferencing, and health monitoring applications. An application different from a lighting control application may be arranged to render on-screen information, e.g. verbal information, in dependence on the sensor signal, or may be arranged to cause a speaker to render verbal information, for example. The application may use mobile device 21, for example, to display the on-screen information or render the verbal information.

As a first example, the following light scenes may be defined for a bedroom:
Reading light: activate light with a light level sufficient for reading; sensors incorporated into the bed transmit sensor signals to bridge; bridge deactivates light if no motion is detected.

Relax light: control light with slowly changing colors; sensors incorporated into the bed transmit sensor signals to bridge; bridge deactivates light if no motion is detected; the motion sensor time-out is high (users are expected to be more static).

Wake-up light: control light with increasing light level, e.g. programmed to start at a certain time; sensors incorporated into the bed transmit signals to bridge; bridge decreases light level or deactivates light if motion is detected.

Nightlight: control light to be substantially dimmed; sensors incorporated into the bed transmit signals to sleep monitoring application.

As a second example, the following light scenes may be defined for a living room:

Romantic light: activate lights near couch with yellowish color and slightly dimmed; camera does not transmit images.

Entertainment light: activate entertainment mode (which renders light effects that are synchronized to content displayed on screen) on lights next to TV and near couch; camera does not transmit images.

Away-from-home light: activate lights near couch with white color and slightly dimmed; camera transmits camera images to security application.

Video chat light: activate light behind the couch with white color and undimmed; camera transmits images to video chat application.

Interactive light scene: activate lights in undimmed mode; camera transmits images or detected events to bridge; bridge controls lights based on sensor signal to make a light respond to a movement of a nearby user.

As a third example, the following light scenes may be defined for a garden:

Garden party light: activate lights near lounge set with yellowish color and slightly dimmed; presence detectors in garden transmit signals to bridge; bridge activates lights near walking paths upon detecting presence.

Garden pet light: all lights in the garden are activated with white color in dimmed mode, presence detectors in garden transmit signals to pet monitoring application.

Garden security light: selected lights in the garden are activated with white color in undimmed mode, presence detectors in garden transmit signals to security monitoring application.

As a fourth example, the following light scenes may be defined for a baby room:

Baby room nightlight: activate light in baby room in deeply dimmed mode; camera transmits images and audio to baby monitoring application.

Baby room play: activate light in baby room in undimmed mode; camera transmits images to bridge; bridge controls light based on sensor signal to make light respond to baby's movement.

In order to use a light scene, the light scene is first associated with one or more lights, e.g. one or more of lights 13-15. A user may be able to associate a light scene with one or more individual lights and/or may be able to associate a light scene with a room and the room with one or more individual lights. In the former case, the user may still be able to associate the individual lights with a room. This makes it possible to prevent that more than one light scene is active at the same time per room. If this is not used, then it may be necessary to define what happens when different light scenes that control a different but overlapping set of lights are active at the same time.

Each light scene is further associated with zero or more sensors (or sensor devices). If a light scene is associated with a sensor, a device and/or application to which the sensor signal should be transmitted is selected/specified for that sensor by the user. The user may be able to select from a list of devices and/or applications, for example. Furthermore, the user may be able to define one or more settings for that sensor (e.g. a presence detection sensitivity).

Sensor settings may also be determined automatically. For instance, if the light scene is called relax light or is detected to have very dim and low light intensities, the system expects the user to be less active and therefore the motion sensor time-out may be longer than for light scenes with higher light outputs (e.g. workout light scene). It is also possible that the system has learned those user activity properties over time, by observing and analyzing the data captured by the involved sensor devices. A sensor that is associated with the previously selected light scene may be deactivated automatically if it is not associated with the currently selected light scene.

Preferably, the device and/or application to which a sensor signal is transmitted and the settings of the sensor are only changed when a user selects a different light scene and not when the user manually changes light settings. Preferably, when a dynamic light scene is selected, it is the selection of the dynamic light scene that changes the sensor mode (which indicates to which device and/or application the sensor signal is transmitted) and not the individual light setting changes.

In a first implementation, if a sensor (e.g. a presence sensor) is able to trigger certain light settings, these light settings may be specified in the light scene that causes the sensor's signal to be transmitted to this light control device/application. Alternatively, these light settings may be specified in a separate, special type of light scene that can be activated at the same time as the light scene that that causes the sensor's signal to be transmitted to this light control device/application. This special type of light scene does not change the sensor mode and may be hidden from the user in a light control app except when modifying light scenes.

In an alternative embodiment, light scenes are not associated with sensors. In this embodiment, a user may be able to associate separately which range of light settings (e.g. color and dim level) should result in the sensor signal being transmitted to a first device and/or application and which range of light settings should result in the sensor signal being transmitted to a second device and/or application.

The user may further be able to specify one or more light devices whose light setting influences the sensor mode. The user may be able to do this in a light control app by associating both light devices and sensors to rooms, for example. In this case, if a light device in the same room as the sensor changes its light setting, this may cause the sensor signal to be transmitted to a different application and/or device. Alternatively, the sensor may be associated automatically with one or more light devices. This may be done by detecting which light devices are within a certain distance of the sensor, for example.

In this alternative embodiment, a light command indicating new light settings may further comprise information indicating whether the new light settings are expected to change quickly, e.g. whether the new light settings are the result of an entertainment mode or the result of a user trying out different settings. Preferably, a sensor mode is only changed if the light setting is not expected to change quickly.

In the embodiment of FIG. 1, the sensor device 1 is configured by another device: mobile device 21 and/or bridge 31. The mobile device 21 comprises a receiver 23, a transmitter 24, a processor 25, a memory 27, and a display 29. In the embodiment of FIG. 1, the display 29 is a touch screen display. The processor 25 is arranged to use the touch screen display 29 to obtain an input signal comprising a request to have one or more of the light devices 13-15 render a new light setting, determine from data stored in the memory 27 which device and/or application of the plurality of devices and/or applications is associated with the new light setting, and use the transmitter 25 to configure the sensor device 1 to transmit a sensor signal (which the sensor device 1 obtains from the sensor 9) to the determined device and/or application.

The bridge 31 comprises a receiver 33, a transmitter 34, a processor 35, and a memory 37. The processor 35 is arranged to use the receiver 33 to obtain an input signal (e.g. a light command) comprising a request to have one or more of the light devices 13-15 render a new light setting, determine from data stored in the memory 37 which device and/or application of the plurality of devices and/or applications is associated with the new light setting, and use the transmitter 35 to configure the sensor device 1 to transmit a sensor signal (which the sensor device 1 obtains from the sensor 9) to the determined device and/or application.

In an alternative embodiment, the sensor device 1 does not need to be configured by another device. In this alternative embodiment, the processor 5 of the sensor device 1 is arranged to use the receiver 3 to obtain information indicating which light setting is currently active on the light devices 13-15, e.g. by listening to wireless transmissions from the bridge 31 to the light devices 13-15, and select the device and/or application by determining from the data which device and/or application of the plurality of devices and/or applications is associated with the indicated light setting.

In the embodiment of the sensor device 1 shown in FIG. 1, the sensor device 1 comprises one processor 5. In an alternative embodiment, the sensor device 1 comprises multiple processors. The processor 5 of the sensor device 1 may be a general-purpose processor, e.g. ARM-based, or an application-specific processor. The processor 5 of sensor device 1 may run a Unix-based operating system for example. The memory 7 may comprise one or more memory units. The memory 7 may comprise solid-state memory, for example.

The receiver 3 and the transmitter 4 may use one or more wired and/or wireless communication technologies such as Wi-Fi (IEEE 802.11) to communicate with the wireless LAN access point 41, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The sensor 9 may comprise a motion sensor, e.g. PIR sensor, a heat sensor and/or a camera, for example. The sensor device 1 may comprise other components typical for a sensor device such as a power connector and/or a battery. The invention may be implemented using a computer program running on one or more processors.

In the embodiment of the mobile device 21 shown in FIG. 1, the mobile device 21 comprises one processor 25. In an alternative embodiment, the mobile device 1 comprises multiple processors. The processor 25 of the mobile device 21 may be a general-purpose processor, e.g. from Qualcomm or ARM-based, or an application-specific processor. The processor 25 of the mobile device 21 may run an Android or iOS operating system for example. The memory 27 may comprise one or more memory units. The memory 27 may comprise solid-state memory, for example. The memory 27 may be used to store an operating system, applications and application data, for example.

The receiver 23 and the transmitter 24 may use one or more wireless communication technologies such as Wi-Fi (IEEE 802.11) to communicate with the wireless LAN access point 41, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 23 and the transmitter 24 are combined into a transceiver. The display 29 may comprise an LCD or OLED panel, for example. The mobile device 21 may comprise other components typical for a mobile device such as a battery and a power connector. The invention may be implemented using a computer program running on one or more processors.

In the embodiment of the bridge 31 shown in FIG. 1, the bridge 31 comprises one processor 35. In an alternative embodiment, the bridge 31 comprises multiple processors. The processor 35 of the bridge 31 may be a general-purpose processor, e.g. ARM-based, or an application-specific processor. The processor 35 of the bridge 31 may run a Unix-based operating system for example. The memory 37 may comprise one or more memory units. The memory 37 may comprise one or more hard disks and/or solid-state memory, for example. The memory 37 may be used to store a table of connected lights, for example.

The receiver 33 and the transmitter 34 may use one or more wireless communication technologies such as Wi-Fi (IEEE 802.11) to communicate with the wireless LAN access point 41, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 33 and the transmitter 34 are combined into a transceiver. The bridge 31 may comprise other components typical for a network device such as a power connector. The invention may be implemented using a computer program running on one or more processors.

Figure 2:
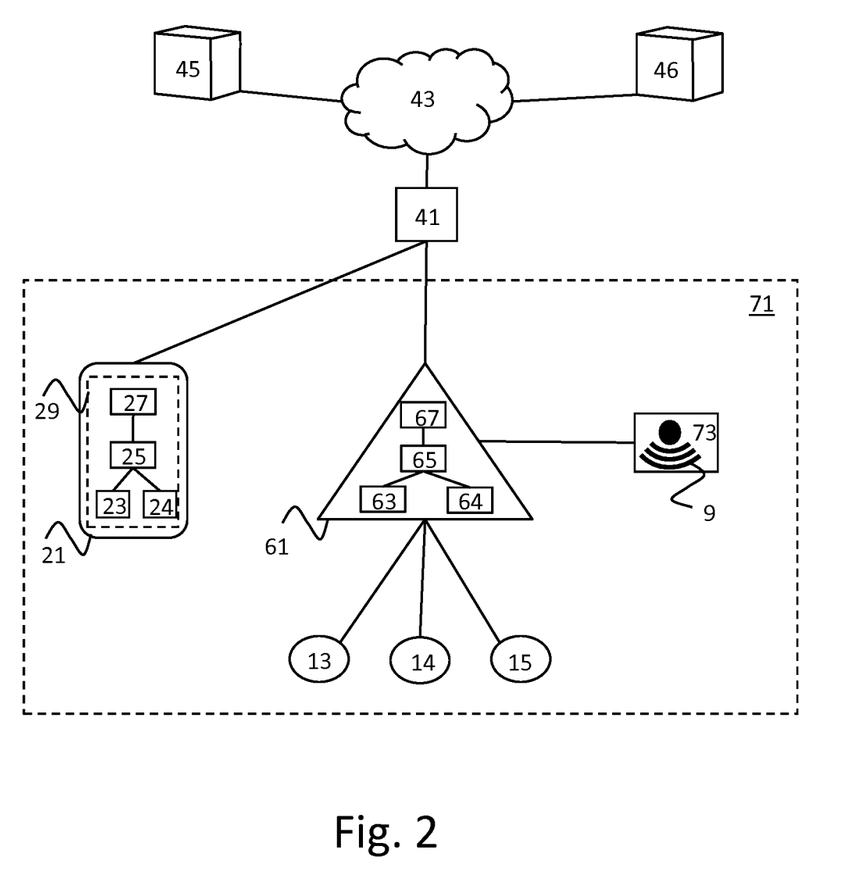
FIG. 2 is a block diagram of a second embodiment of the device for obtaining a sensor signal.

FIG. 2 shows a lighting system 71 comprising the mobile device 21 and the light devices 13-15 of FIG. 1, a bridge 61 and a sensor device 73. In the embodiment of FIG. 2, the sensor 9 is incorporated into the sensor device 73 and this sensor device 73 always transmits the sensor signal produced by the sensor 9 to the bridge 61, which may be a Philips Hue light bridge, for example. In the embodiment of FIG. 2, it is still the mobile device 21 that transmits a configuration message, but in the lighting system 71, the mobile device 21 transmits the configuration message to the bridge 61. The bridge 61 then stores in its memory 67 information indicating to which device and/or application of the plurality of devices and/or applications the sensor signal should now be transmitted.

The bridge 61 comprises a receiver 63, a transmitter 64, a processor 65, and a memory 67. The processor 65 is arranged to use the receiver 63 to receive a sensor signal from the sensor device 73. The processor 65 is further configured to select based on data stored in the memory 67 which device and/or application of a plurality of devices and/or applications the sensor signal should be transmitted to. The selection depends on which light setting is currently active on the light devices 13-15. The processor 65 is further configured to use the transmitter 64 to transmit the sensor signal to the selected device and/or application.

In the embodiment of FIG. 2, the bridge 61 is configured by another device: mobile device 21. In an alternative embodiment, the bridge 61 does not need to be configured by another device. In this alternative embodiment, the processor 65 of the bridge 61 is arranged to use the receiver 63 to obtain information indicating which light setting is currently active on the light devices 13-15, e.g. by examining light commands destined for the light devices 13-15 that are received by the receiver 63, and select the device and/or application by determining from the data which device and/or application of the plurality of devices and/or applications is associated with the indicated light setting.

In the embodiment of the bridge 61 shown in FIG. 2, the bridge 61 comprises one processor 65. In an alternative embodiment, the bridge 61 comprises multiple processors. The processor 65 of the bridge 61 may be a general-purpose processor, e.g. ARM-based, or an application-specific processor. The processor 65 of the bridge 61 may run a Unix-based operating system for example. The memory 67 may comprise one or more memory units. The memory 67 may comprise one or more hard disks and/or solid-state memory, for example. The memory 67 may be used to store a table of connected lights, for example.

The receiver 63 and the transmitter 64 may use one or more wired and/or wireless communication technologies such as Wi-Fi (IEEE 802.11) to communicate with the wireless LAN access point 41, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 63 and the transmitter 64 are combined into a transceiver. The bridge 61 may comprise other components typical for a network device such as a power connector. The invention may be implemented using a computer program running on one or more processors.

Figure 3:
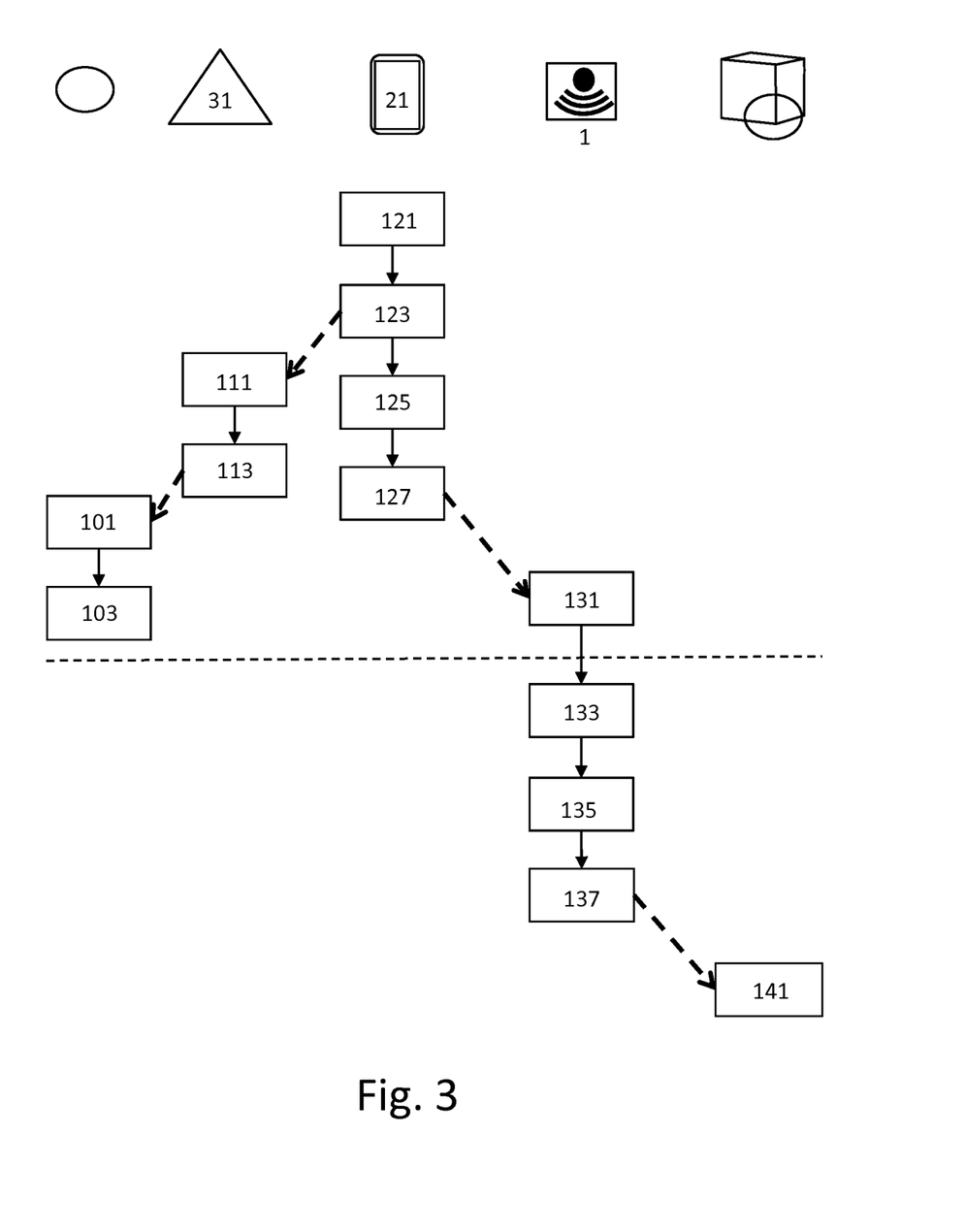
FIG. 3 is a flow diagram of a first embodiment of the methods of obtaining the sensor signal and configuring a device for obtaining the sensor signal.

A first embodiment of a method of obtaining a sensor signal and configuring a device for obtaining the sensor signal is shown in FIG. 3. A step 121 comprises the mobile device 21 of FIG. 1 obtaining an input signal comprising a request to have one or more light devices render a new light setting. In the embodiment of FIG. 3, this input signal is received via a touch screen. For example, a user selects an "away-from-home" or a "wake-up" light scene using an app on the mobile device 21.

A step 123 comprises the mobile device 21 transmitting a light command comprising an identifier of the selected light scene to the bridge 31 of FIG. 1. A step 111 comprises the bridge 31 receiving this light command. A step 113 comprises the bridge 31 broadcasting the light command. A step 101 comprises one or more light devices receiving this broadcast. A step 103 comprises a light device activating a light setting associated with the received light scene identifier if such an association has been configured in the memory of the light device.

A step 125 comprises the mobile device 21 determining from data stored in a memory which device and/or application of the plurality of devices and/or applications is associated with the new light setting. For example, a security application running on an Internet server may be associated with the "away-from-home" light scene and a light control application which activates a light source upon detecting a certain amount of motion may be associated with the "wake-up" light scene. A step 127 comprises the mobile device 21 transmitting a configuration message to the sensor device 1. The configuration message identifies the determined device and/or application.

A step 131 comprises the sensor device 1 of FIG. 1 receiving the configuration message. The information identifying the determined device and/or application is stored as data in a memory of the sensor device 1. A step 133 comprises the sensor device 1 obtaining a sensor signal from a sensor. The sensor is arranged to sense in a field of view. A step 135 comprises the sensor device 1 selecting based on the data stored in a memory which device and/or application of a plurality of devices and/or applications the sensor signal should be transmitted to. Thus, the selection depends on which light setting is currently active on one or more light devices.

A step 137 comprises the sensor device 1 transmitting the sensor signal to the selected device and/or application. A step 141 comprises the selected device and/or application receiving the sensor signal. For example, if a user selected an "away-from-home" light scene in step 121, then the sensor signal, e.g. a signal from a PIR sensor or camera, may be transmitted to a security application running on Internet server 45 of FIG. 1 in step 137. If a user selected an "wake-up" light scene in step 121, then the sensor signal may be transmitted to bridge 31.

Figure 4:
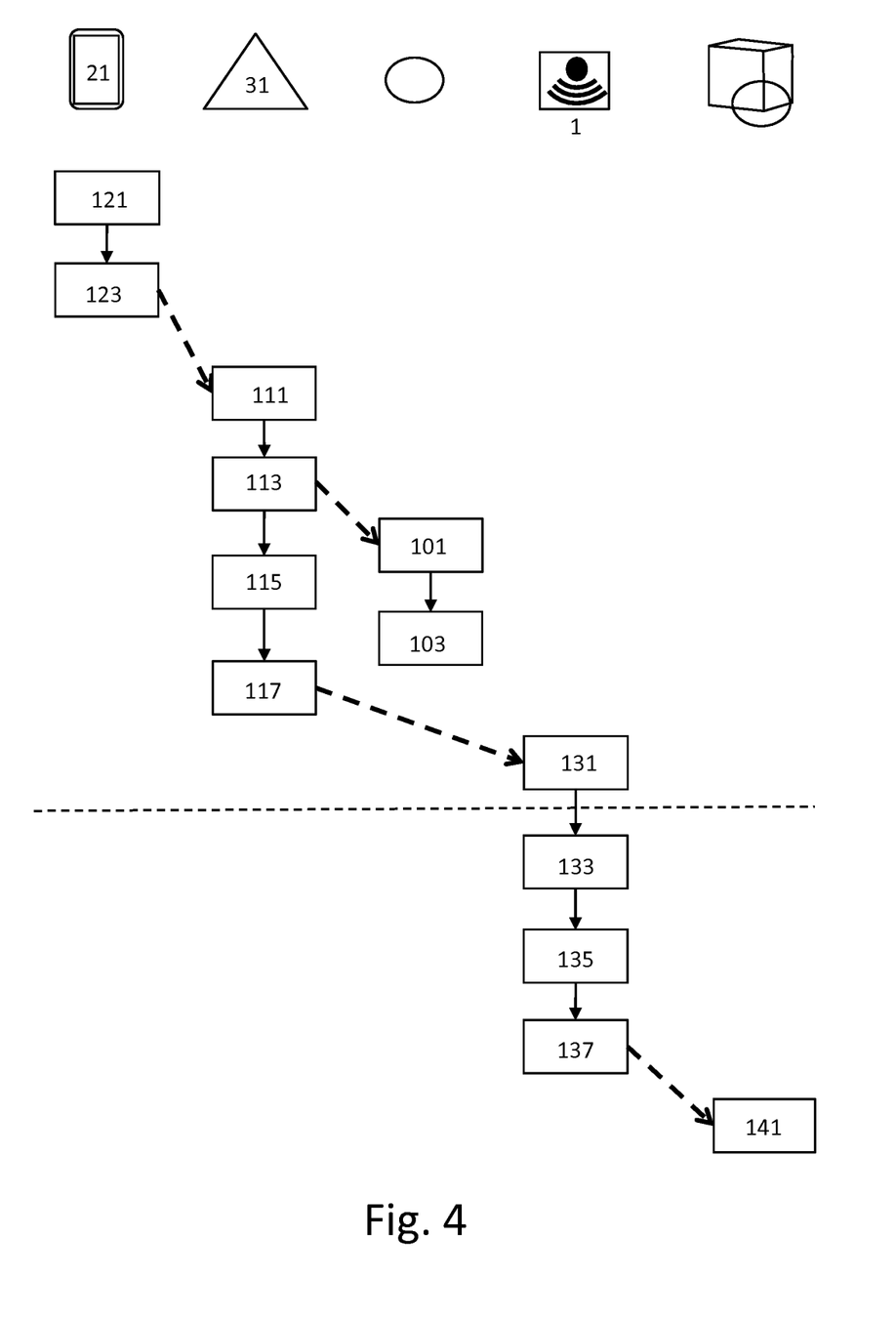
FIG. 4 is a flow diagram of a second embodiment of the methods of obtaining the sensor signal and configuring a device for obtaining the sensor signal.

In the embodiment of FIG. 3, it is the mobile device 21 that configures the sensor device 1. In the embodiment of FIG. 4, it is the bridge 31 that configures the sensor device 1. In the embodiment of FIG. 4, steps 125 and 127 of FIG. 3 are not performed by the mobile device 21. The light command received by the bridge 31 in step 111 is an input signal comprising a request to have one or more light devices render a new light setting. After the bridge 31 has broadcast the light command in step 113, the bridge 31 performs steps 115 and 117.

Step 115 comprises the bridge 31 determining from data stored in a memory which device and/or application of the plurality of devices and/or applications is associated with the new light setting. Step 117 comprises the bridge 31 transmitting a configuration message to the sensor device 1. The configuration message identifies the determined device and/or application. Next, steps 131,133,135,137 and 141 are performed as described in relation to FIG. 3.

Figure 5:
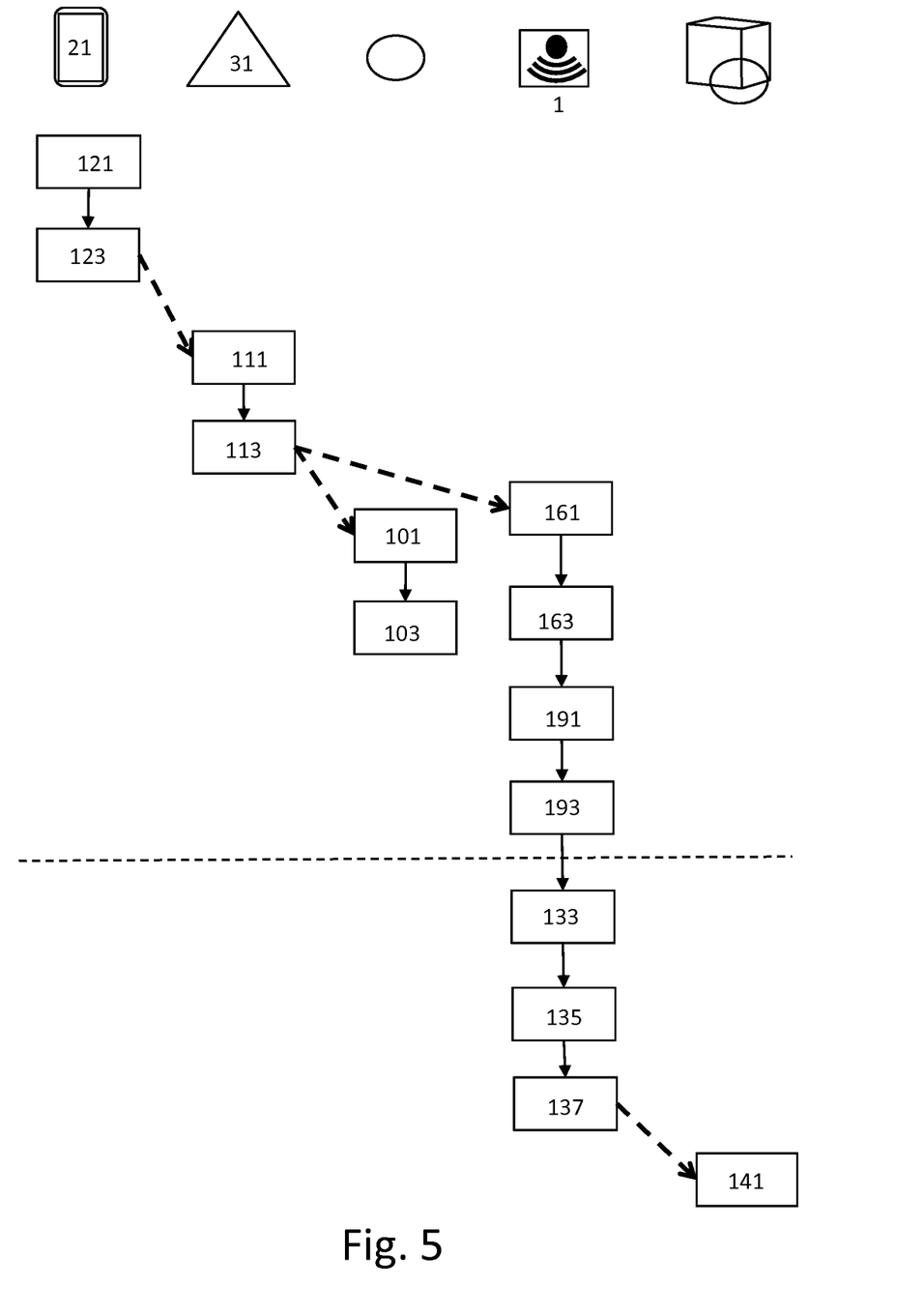
FIG. 5 is a flow diagram of a third embodiment of the methods of obtaining the sensor signal and configuring a device for obtaining the sensor signal.

In the embodiment of FIGS. 3 and 4, the sensor device 1 is configured by another device. In the embodiment of FIG. 5, the sensor device 1 configures itself. Steps 115, 117, and 131 of FIG. 3 and steps 125, 127, and 131 of FIG. 4 are therefore absent in FIG. 5. In step 161, the sensor device 1 obtains information indicating which light setting is currently active on the one or more light devices by listening to the broadcast of the light command by the bridge 31 in step 113. Next, in step 163, the sensor device 1 select the device and/or application by determining from data stored in a memory, e.g. its own memory, which device and/or application of the plurality of devices and/or applications is associated with the indicated light setting and stores this information in its memory.

In the embodiment of FIG. 5, the sensor device 1 performs steps 191 and 193 next. Step 191 comprises selecting a sensor setting associated with the light setting from a plurality of sensor settings based on the data stored in the memory. Step 193 comprises configuring the sensor according to the selected sensor setting. The plurality of sensor settings differ from each other in that they result in sensor signals comprising different amounts of data. The amount of data in a sensor signal depends on a desired level of privacy, a desired level or accuracy and/or a desired type of information. Since the sensor produces the desired (amount of) information, it is not necessary to adapt the sensor signal after it has been produced. Next, steps 133,135,137 and 141 are performed as described in relation to FIG. 3.

Figure 6:
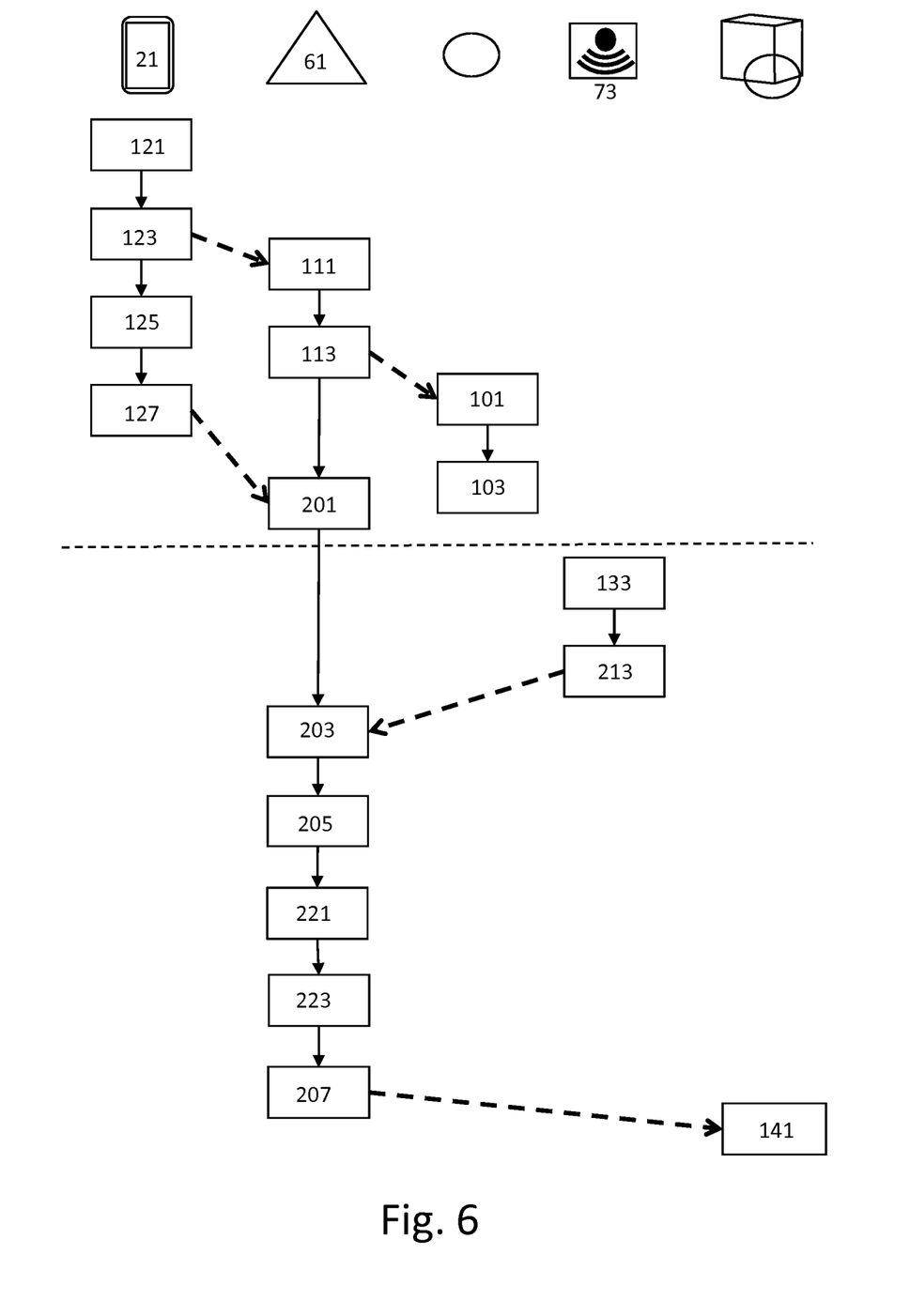
FIG. 6 is a flow diagram of a fourth embodiment of the methods of obtaining the sensor signal and configuring a device for obtaining the sensor signal.
Figure 7:
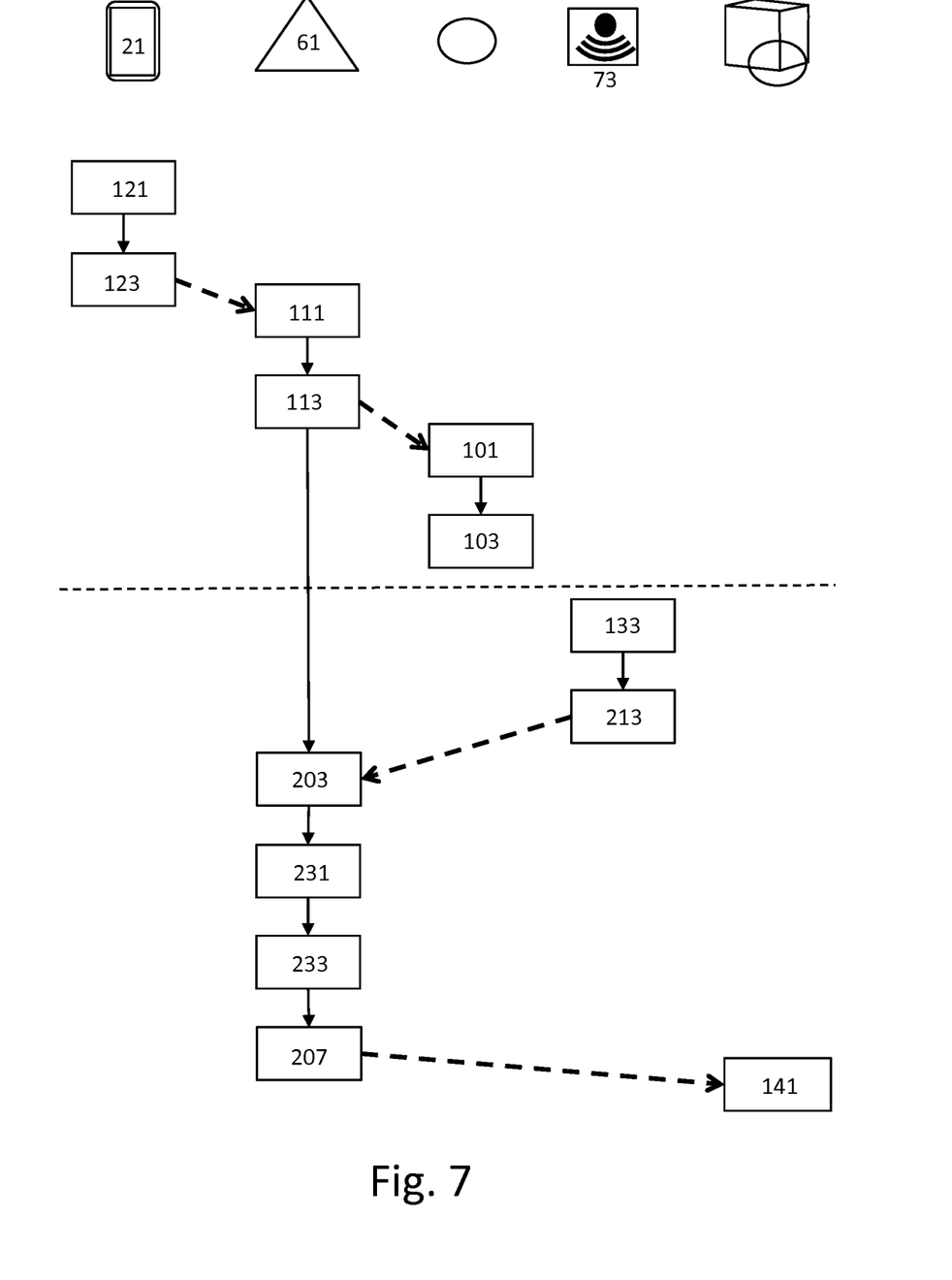
FIG. 7 is a flow diagram of a fifth embodiment of the methods of obtaining the sensor signal and configuring a device for obtaining the sensor signal.

In the embodiments of FIGS. 3 to 5, it is the sensor device 1 that transmits the sensor signal to different devices and/or applications. In the embodiments of FIGS. 6 and 7, the sensor device 73 of FIG. 2 always transmits the sensor signal to the bridge 61 and the bridge 61 transmits the sensor signal to different devices and/or applications.

In the embodiment of FIG. 6, it is the mobile device 21 that configures the bridge 61. In the embodiment of FIG. 6, steps 121 to 127 are performed in the manner described in relation to FIG. 3, except that the configuration message is transmitted to the bridge 61 instead of to the sensor device 1. Step 201 comprises the bridge 61 receiving this configuration message and storing the information indicating to which device and/or application of the plurality of devices and/or applications the sensor signal should now be transmitted as data in its memory.

Next, the same step 133 that was performed by the sensor device 1 in the embodiments of FIGS. 3 to 5 is performed by the sensor device 73. In the embodiment of FIG. 6, the sensor devices 73 always transmits the sensor signal to the bridge 61 in step 213. Step 203 comprises the bridge 61 receiving the sensor signal. Step 205 comprises the bridge 61 selecting based on the data stored in its memory in step 201 which device and/or application of a plurality of devices and/or applications the sensor signal should be transmitted to. Thus, the selection depends on which light setting is currently active on one or more light devices.

In the embodiment of FIG. 6, the bridge 61 then performs steps 221 and 223. Step 221 comprises selecting a signal adaptation method associated with the currently active light setting from a plurality of signal adaptation methods based on the data. Step 223 comprises adapting the sensor signal by applying the selected signal adaptation method before transmitting the sensor signal to the selected device and/or application in step 207.

The plurality of signal adaptations differ from each other in that they result in sensor signals comprising different amounts of data. The amount of data in a sensor signal depends on a desired level of privacy, a desired level or accuracy and/or a desired type of information. For example, the frame rate of a sensor signal obtained from a camera may be reduced if the sensor signal should be transmitted to a bridge for a lighting control application. Step 207 comprises the bridge 61 transmitting the sensor signal to the selected device and/or application. Step 141 comprises the selected device and/or application receiving the sensor signal.

In the embodiment of FIG. 6, the bridge 61 receives a configuration message from another device. In the embodiment of FIG. 7, the bridge 61 is not configured, but selects a device and/or application for transmitting the sensor signal to upon receiving the sensor signal. Steps 125, 127, and 201 of FIG. 6 are therefore absent in FIG. 7. Steps 121, 123, 111, 113, 101, 103, 133 and 213 are the same as described in relation to FIG. 6, except that step 111 comprises storing information indicating which light setting is currently active on the one or more light devices.

After receiving the sensor signal in step 203, as described in relation to FIG. 6, the bridge 61 performs steps 231 and 233. In step 231, the bridge 61 obtains information indicating which light setting is currently active on the one or more light devices, which was stored in step 111. Next, in step 233, the bridge 61 determines from data stored in the memory of bridge 61 which device and/or application of the plurality of devices and/or applications is associated with this light setting. Next, steps 207 and 141 are performed as described in relation to FIG. 6.

In the embodiment of FIG. 7, the bridge 61 selects the device and/or application after receiving the sensor signal. In a variant on FIG. 7, the bridge 61 selects the device and/or application before receiving the sensor signal, as described in relation to FIG. 5 with respect to the sensor device 1. In the embodiment of FIG. 5, the sensor device 1 selects the device and/or application before receiving the sensor signal. In a variant on FIG. 5, the sensor device 1 selects the device and/or application after receiving the sensor signal, as described in relation to FIG. 7 with respect to the bridge 61.

In the embodiment of FIG. 5, but not in the embodiments of FIGS. 3,4,6 and 7, settings of the sensor are selected based on the currently active light setting. In a variant on FIG. 5, settings of the sensor are not selected based on the currently active light setting. In a variant on FIGS. 3,4,6 and/or 7, the settings of the sensor are selected based on the currently active light setting, as described in relation to FIG. 5. In the embodiment of FIG. 6, but not in the embodiments of FIGS. 3,4,5 and 7, the sensor signal is adapted based on the currently active light setting (after being produced and before being transmitted to the selected device and/or application). In a variant on FIG. 6, the sensor signal is not adapted based on the currently active light setting. In a variant on FIGS. 3,4,5 and/or 7, the sensor signal is adapted based on the currently active light setting, as described in relation to FIG. 6.

Figure 8:
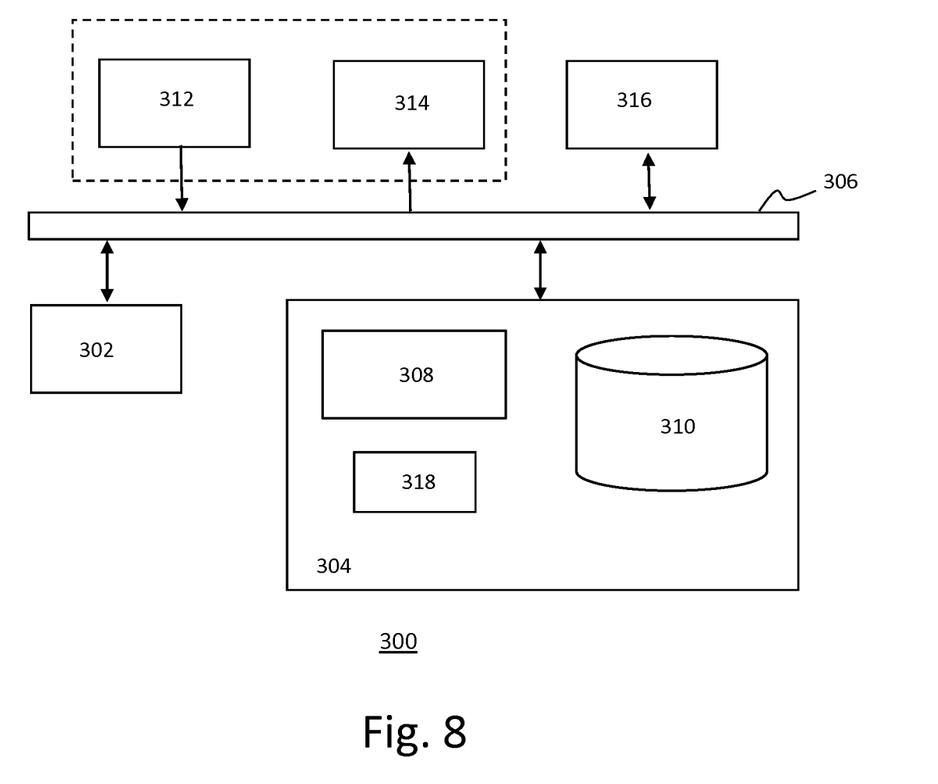
FIG. 8 is a block diagram of an exemplary data processing system for performing the method of the invention.

FIG. 8 depicts a block diagram illustrating an exemplary data processing system that may perform the method as described with reference to FIGS. 3 to 7.

As shown in FIG. 8, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 8 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 8, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 8) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device for obtaining a sensor signal for use in a lighting system comprising one or more light devices and a sensor, and for changing a sensing function in dependence on a light setting currently active on said one or more light devices, said electronic device comprising:
    a memory;
    at least one input interface;
    at least one output interface; and
    at least one processor arranged to:
        use said at least one input interface to obtain a sensor signal from said sensor, said sensor being arranged to sense in a field of view,
        use said at least one input interface to obtain information indicating said light setting that is currently active on said one or more light devices and/or determine from said sensor signal said light setting that is currently active on said one or more light devices,
        select, based on data stored in said memory, a device and/or an application of a plurality of devices and/or applications said sensor signal should be transmitted to by determining from said data which device and/or application of said plurality of devices and/or applications is associated with said light setting, and
        use said at least one output interface to transmit said sensor signal to said selected device and/or application
    wherein a first device and/or application of said plurality of devices and/or applications is a lighting control device and/or application and a second device and/or application of said plurality of devices and/or applications is a device and/or application different from a lighting control device and/or application, and said first device and/or application is a node in a lighting network and said second device and/or application is arranged to render on-screen information in dependence on said sensor signal.

2. An electronic device as claimed in claim 1, wherein said second device and/or application is arranged to cause a speaker and/or a display to render verbal information.

3. An electronic device as claimed in claim 1, wherein said second device and/or application is arranged to perform at least one of: sleep monitoring, baby monitoring, security monitoring, behavior monitoring, people counting, pet monitoring, video conferencing, and health monitoring.

4. An electronic device as claimed in claim 1, wherein said at least one processor is arranged to:
   select a signal adaptation method from a plurality of signal adaptation methods based on said data, said selected signal adaptation method being associated with said currently active light setting, and
   adapt said sensor signal by applying said selected signal adaptation method before transmitting said sensor signal to said selected device and/or application,
   wherein said plurality of signal adaptation differ from each other in that they result in sensor signals comprising different amounts of data, said amount of data in a sensor signal depending on a desired level of privacy, a desired level of accuracy and/or a desired type of information.

5. An electronic device as claimed in claim 1, wherein said at least one processor is arranged to:
   select a sensor setting from a plurality of sensor settings based on said data, said sensor setting being associated with said light setting, and
   configure said sensor according to said selected sensor setting,
   wherein said plurality of sensor settings differ from each other in that they result in sensor signals comprising different amounts of data, said amount of data in a sensor signal depending on a desired level of privacy, a desired level of accuracy and/or a desired type of information.

6. A method of obtaining a sensor signal for use in a lighting system comprising one or more light devices and a sensor, to change a sensing function in dependence on a light setting currently active on said one or more light devices, said method comprising:
   obtaining a sensor signal from said sensor, said sensor being arranged to sense in a field of view;
   obtaining information indicating which light setting is currently active on said one or more light devices and/or determining from said sensor signal which light setting is currently active on said one or more light devices;
   selecting based on data stored in a memory which device and/or application of a plurality of devices and/or applications said sensor signal should be transmitted to by determining from said data which device and/or application of said plurality of devices and/or applications is associated with said indicated light setting; and
   transmitting said sensor signal to said selected device and/or application;
   rendering, by a second device and/or application of said plurality of devices and/or applications, on-screen information in dependence on said sensor signal, wherein a first device and/or application of said plurality of devices and/or applications is a lighting control device and/or application and said second device and/or application is a device and/or application different from a lighting control device and/or application, and said first device and/or application is a node in a lighting network.

7. A non-transitory computer readable medium comprising at least one software code portion or a computer program product storing at least one software code portion, the software code portion, when executed on a computer system comprising an input interface, an output interface and a processor, cause the processor to perform the method of claim 6.

* * * * *